(12) United States Patent
Roh et al.

(10) Patent No.: US 8,045,934 B2
(45) Date of Patent: Oct. 25, 2011

(54) SUPPORT PLATE AND MOBILE COMMUNICATION TERMINAL HAVING THE SAME

(75) Inventors: Yang-Woon Roh, Icheon-si (KR);
Hyung-Gon Ryu, Suwon-si (KR);
Jung-Hoon Lee, Seoul (KR);
Kyoung-Mi Yoo, Suwon-si (KR);
Jong-Hyun Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 512 days.

(21) Appl. No.: 12/313,821

(22) Filed: Nov. 25, 2008

(65) Prior Publication Data

US 2009/0149138 A1   Jun. 11, 2009

(30) Foreign Application Priority Data

Nov. 26, 2007 (KR) .................. 10-2007-0120921

(51) Int. Cl.
*H04B 1/38* (2006.01)
(52) U.S. Cl. ...................... 455/90.3; 455/347
(58) Field of Classification Search .............. 53/411, 53/427, 472, 442, 449, 452, 131.1; 206/448, 206/484, 497, 583; 343/700, 702, 872, 873; 455/90.3, 347, 348, 280
See application file for complete search history.

(56) References Cited

U.S. PATENT DOCUMENTS

| | | | |
|---|---|---|---|
| 6,856,819 B2* | 2/2005 | Itoh | 455/575.7 |
| 2004/0104848 A1 | 6/2004 | Desclos et al. | |
| 2004/0233110 A1 | 11/2004 | Hung et al. | |
| 2005/0239416 A1 | 10/2005 | Shimizu | |
| 2006/0192712 A1 | 8/2006 | Park et al. | |

OTHER PUBLICATIONS

European Search Report dated Jan. 24, 2011 in connection with European Patent Application No. 08 16 9495.
Partial European Search Report dated Oct. 18, 2010 in connection with European Patent Application No. 08 16 9495.

* cited by examiner

*Primary Examiner* — An Luu

(57) ABSTRACT

A support plate includes a plate body, which has a shape of a flat plate with predetermined width and length and made of metal, and a radio coverage area member, which is provided at one of opposite ends of the plate body so as to be located adjacent to a radio coverage area of an antenna and made of plastic. Further, a mobile communication terminal has the support plate that supports a mobile communication terminal body on which at least one antenna is installed and transmits and receives radio waves through the antenna.

13 Claims, 6 Drawing Sheets

|  | GSM900 | | | DCS | | |
|---|---|---|---|---|---|---|
| CH | 975 | 58 | 124 | 512 | 644 | 885 |
| ① | | | | | | |
| Power | 22.82 | 19.91 | 19.45 | 21.98 | 21.97 | 17.83 |
| BER | 96.6 | 96.9 | 95.5 | 98.6 | 97.1 | 94.4 |
| ② | | | | | | |
| Power | 25.41 | 25.38 | 24.56 | 21.13 | 22.22 | 19.62 |
| BER | 100.9 | 101.6 | 100.4 | 99.7 | 98.6 | 95.7 |

FIG. 12

|  | GSM900 | | | DCS | | |
|---|---|---|---|---|---|---|
| CH | 975 | 58 | 124 | 512 | 644 | 885 |
| ① | | | | | | |
| BER | 90.6 | 87 | 83.7 | 100.8 | 99.7 | 96.8 |
| Power | 18.3 | 16.8 | 15.3 | 21.3 | 24.3 | 21.5 |
| ② | | | | | | |
| BER | 101.6 | 98.9 | 96.2 | 101.5 | 100.2 | 98 |
| Power | 29.2 | 29.3 | 26.9 | 21 | 22.3 | 21.1 |

SUPPORT PLATE AND MOBILE COMMUNICATION TERMINAL HAVING THE SAME

CROSS-REFERENCE TO RELATED APPLICATION(S) AND CLAIM OF PRIORITY

The present application makes reference to and claims all benefits accruing under 35 U.S.C. §119 from an application for "SUPPORT PLATE AND MOBILE COMMUNICATION TERMINAL HAVING THE SAME" earlier filed in the Korean Intellectual Property Office on Nov. 26, 2007 and there duly assigned Serial No. 10-2007-0120921.

TECHNICAL FIELD OF THE INVENTION

The present invention relates to a mobile communication terminal and, more particularly, to a support plate which supports a mobile communication terminal's body on which an antenna is installed as well as facilitates transceiving radio waves through the antenna, and a mobile communication terminal having the same.

BACKGROUND OF THE INVENTION

In general, mobile communication terminals function to exchange predetermined information between subscribers using radio communication.

Specifically, these mobile communication terminals transmit or receive image information including speech information and character information using a predetermined frequency bandwidth.

Thus, the mobile communication terminals are equipped with an antenna so as to be able to transceive such information through the frequency bandwidth.

Each mobile communication terminal generally has a single antenna in its body.

Thus, a transmission or reception rate of the information is dependent on radiation performance of the antenna.

Recently, these mobile communication terminals have been equipped with two antennas, which use different frequency bandwidths.

For example, a world phone has two antennas so as to support different frequency bandwidths, such as Global System for Mobile Communications (GSM) and Code Division Multiple Access (CDMA), at the same time.

Further, a dual-standby phone has two antennas so as to support the same two frequency bandwidths (GSM and GSM) at the same time.

Such two antennas are applied to a slide-type mobile communication terminal.

The slide-type mobile communication terminal has a main body and a sub-body slidably connected with the main body.

Generally, the main body is equipped with a liquid crystal display window, and the sub-body is equipped with a plurality of key pads.

Further, one of the two antennas is mounted in an upper end of the main body, and the other antenna is mounted in a lower end of the sub-body.

The reason why the antennas are disposed on the upper and lower ends in this way is to maximize the radiation performance of the antennas by having the antennas spaced apart from each other by a predetermined distance.

Thus, the two antennas are used as an intenna (built-in antenna) type.

The sub-body has a flat support plate thereinside which is made of a metal. The support plate is less than or equal to a width and a length of the sub-body.

Thus, the support plate can support the sub-body.

However, although the two antennas are spaced apart from each other by a predetermined distance, the radiation performance thereof cannot be easily improved when the body is sensitive to ground condition.

In addition, this support plate is made of a metal, and the upper end thereof is located adjacent to a region where the antenna transmits and receives the radio waves. As such, the upper end of the supporting body supporting the sub-body reduces the radiation performance of the antenna installed on the upper end of the main body.

SUMMARY OF THE INVENTION

To address the above-discussed deficiencies of the prior art, it is a primary object to provide a mobile communication terminal having a support plate, in which one end of the support plate installed on the mobile communication terminal is partly made of plastic or is partly provided with an empty space, and is disposed adjacent to the radio coverage area of an antenna installed on one end of a main body of the mobile communication terminal, thereby improving radiation performance of the antenna.

Further, the present invention is directed to a mobile communication terminal having a support plate, in which the mobile communication terminal has antennas with frequency bandwidths which are equal to each other, at opposite ends thereof, and which one end of the support plate is made of plastic and is selectively uncoupled from a sub-body of the mobile communication terminal so as to be able to improve radiation performance of the antennas capable of transmitting and receiving radio information.

According to an aspect of the invention, there is provided a support plate, which includes a plate body made of a flat metal plate with predetermined width and length, and a radio coverage area member made of plastic, the radio coverage area member provided to one of opposite ends of the plate body so as to be located adjacent to a radio coverage area of an antenna.

Here, the plate body may be bonded with the radio coverage area member by heat.

In this case, the radio coverage area member may have a plurality of through-holes at one end thereof in a longitudinal direction, and the plate body may come into close contact with one end of the radio coverage area member at one end thereof. Further, the plate body may be bonded with the radio coverage area member by thermal bonding members, which are inserted into the respective through-holes and heads of which are supported around the respective through-holes.

Here, the thermal bonding members may be bonded with one end of the plate body by heat.

Further, the radio coverage area member may be uncoupled from the plate body.

Here, the plate body may include a ridge protruding from one end thereof in a longitudinal direction, and the radio coverage area member may include a slot, into which the ridge is fitted, in one end thereof.

Furthermore, the plastic may be one selected from colored plastic and colorless plastic.

Further, the radio coverage area member may include a main support body, which is located at one end of the plate body and has a predetermined length, a pair of extending bodies, which extends from opposite ends of the main support body at a predetermined length, and a cover body, which is located between the main support body and the extending bodies.

According to the present invention, one end of the support plate installed on the mobile communication terminal is partly made of plastic or is partly provided with an empty space, and is disposed adjacent to the radio coverage area of an antenna installed on one end of a main body of the mobile communication terminal, so that radiation performance of the antenna can be improved.

Further, a mobile communication terminal has antennas with frequency bandwidths which are equal to each other, at opposite ends thereof. One end of the support plate is made of plastic and is selectively uncoupled from a sub-body of the mobile communication terminal so as to be able to improve radiation performance of the antennas capable of transmitting and receiving radio information.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 12 shows a data table in which the case of employing a support plate according to a second embodiment of the present invention is compared with the case of employing a conventional support plate in terms of the performance of a first antenna.

DETAILED DESCRIPTION OF THE INVENTION

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged mobile communication terminal.

Figure 1:
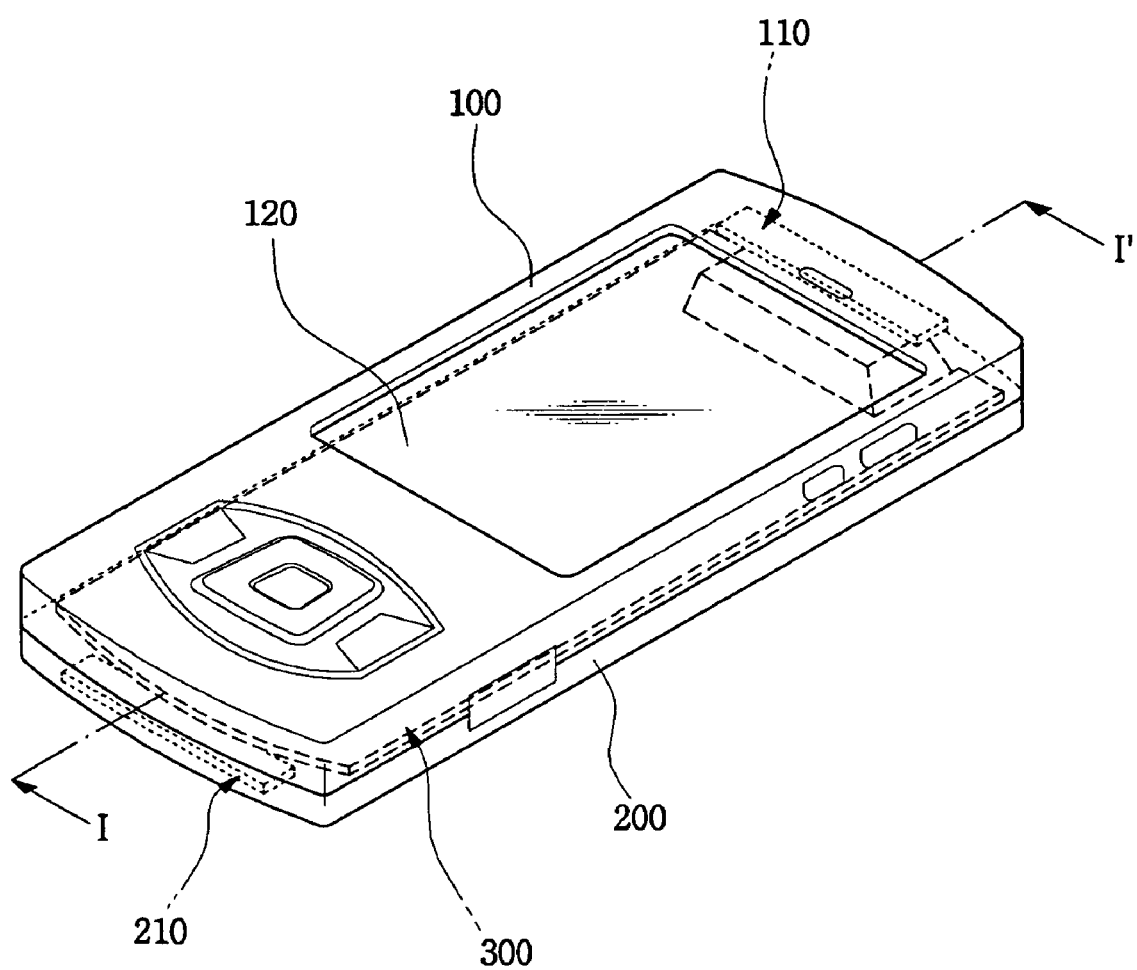
FIG. 1 is a perspective view illustrating a mobile communication terminal having a support plate according to an embodiment of the present invention.
Figure 2:
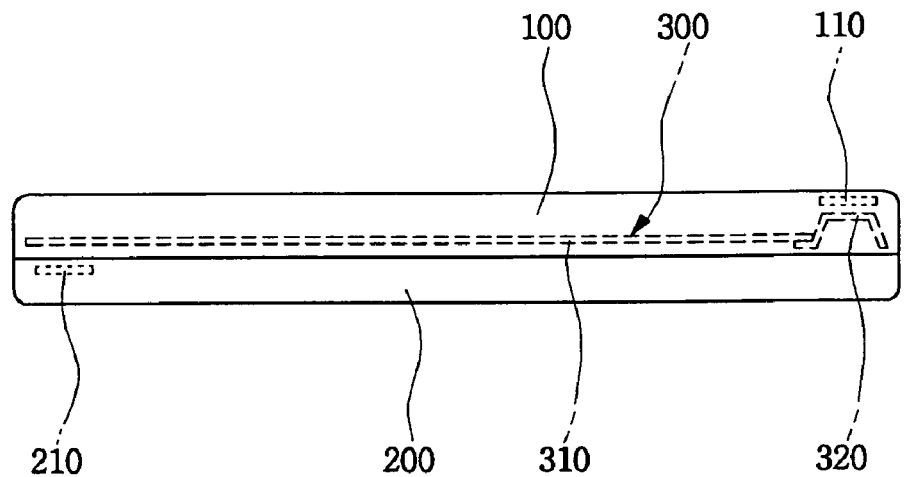
FIG. 2 is a cross-sectional view taken along the line I-I' of FIG. 1.
Figure 3:
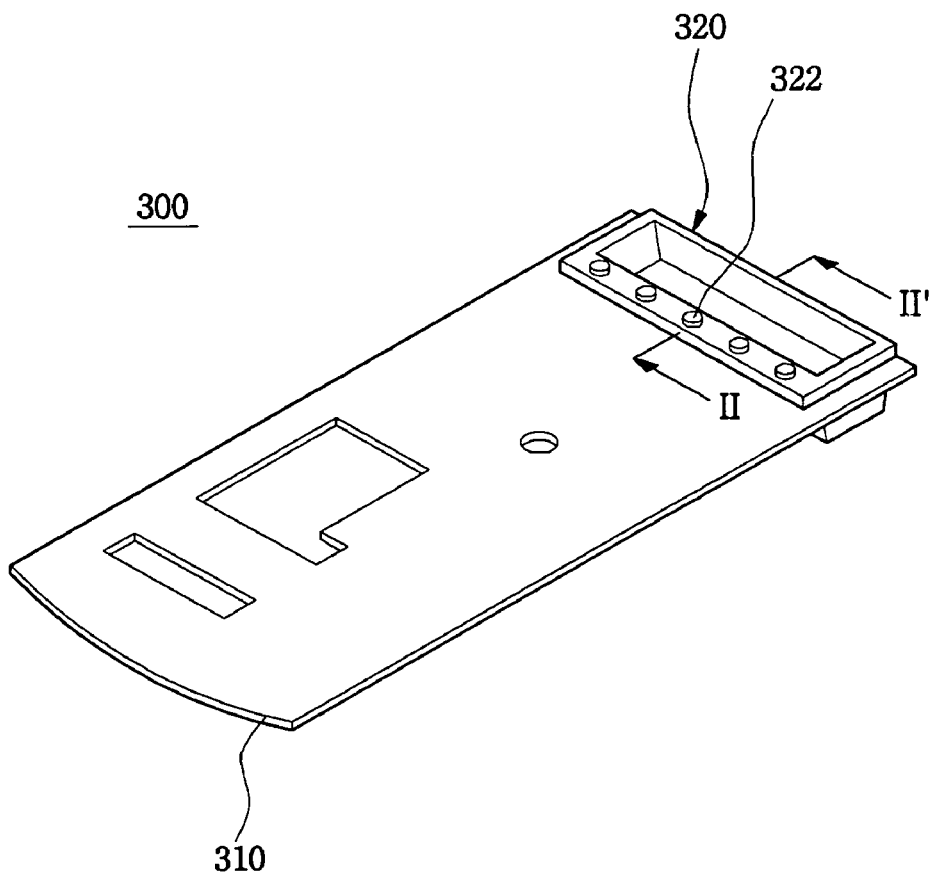
FIG. 3 is a perspective view illustrating a support plate according to a first embodiment of the present invention.
Figure 4:
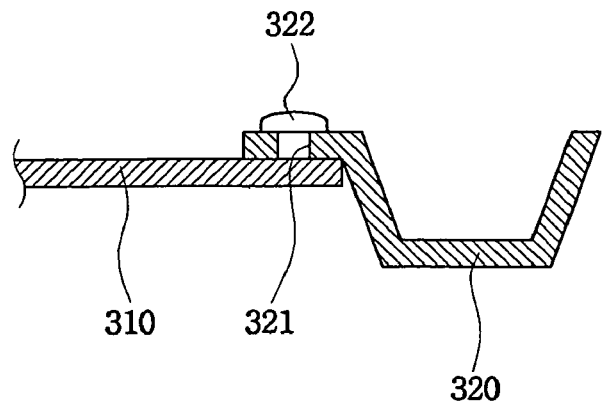
FIG. 4 is a cross-sectional view taken along the line II-II' of FIG. 3.
Figure 5:
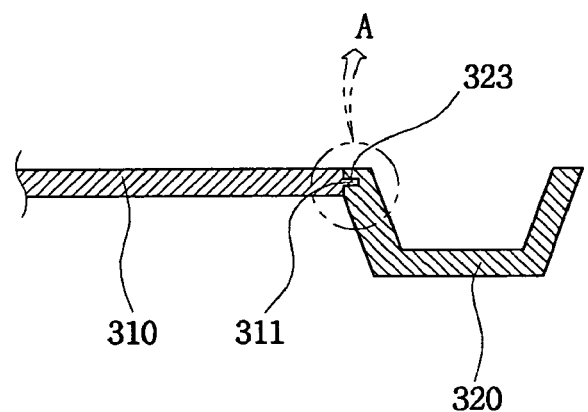
FIG. 5 is a cross-sectional view illustrating a different structure in which the plate body of FIG. 3 is joined with a radio coverage area member.
Figure 6:
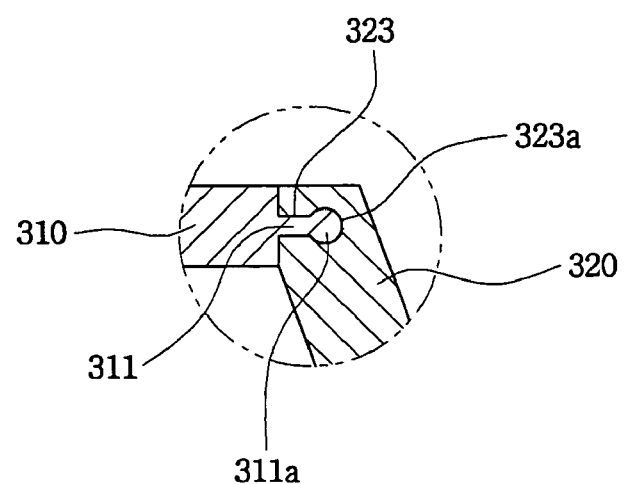
FIG. 6 is an enlarged cross-sectional view illustrating part A of FIG. 5.
Figures 7, 8:
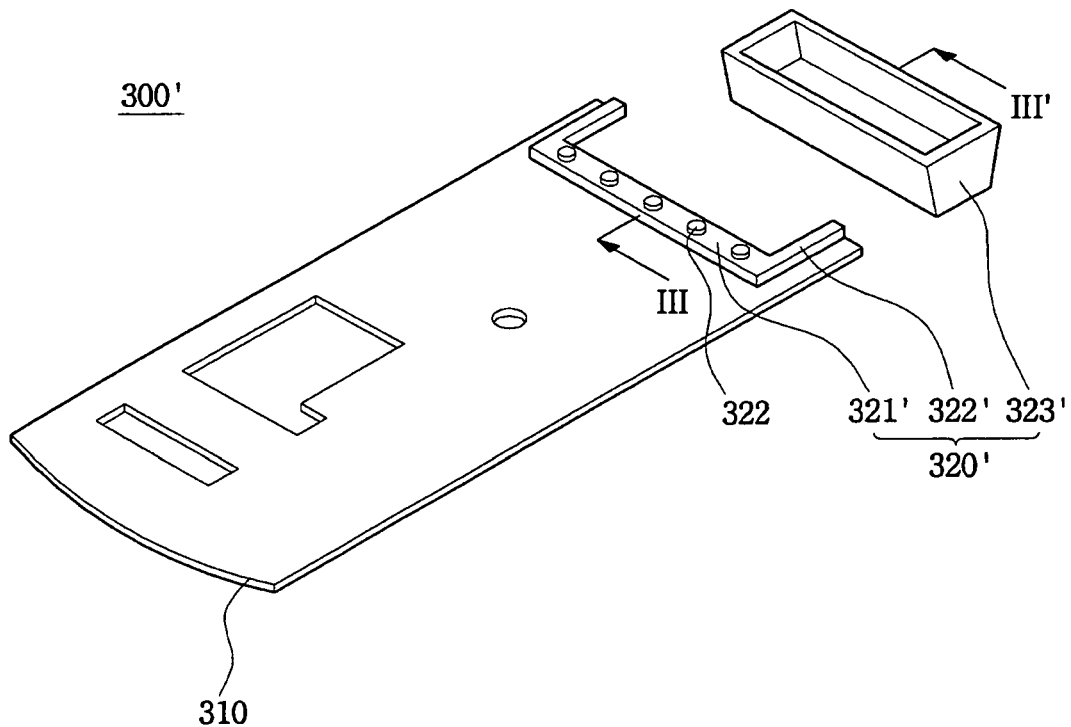
FIG. 7 shows a data table in which the case of employing a support plate according to an embodiment of the present invention is compared with the case of employing a conventional support plate in terms of the performance of a first antenna.
FIG. 8 is a perspective view illustrating a support plate according to a second embodiment of the present invention.

FIG. 1 is a perspective view illustrating a mobile communication terminal having a support plate according to an embodiment of the present invention. FIG. 2 is a cross-sectional view taken along the line I-I' of FIG. 1. FIG. 3 is a perspective view illustrating a support plate according to a first embodiment of the present invention. FIG. 4 is a cross-sectional view taken along the line II-II' of FIG. 3. FIG. 5 is a cross-sectional view illustrating a different structure in which the plate body of FIG. 3 is joined with a radio coverage area member. FIG. 6 is an enlarged cross-sectional view illustrating part A of FIG. 5. FIG. 7 shows a data table in which the case of employing a support plate according to an embodiment of the present invention is compared with the case of employing a conventional support plate in terms of the performance of a first antenna.

Referring to FIGS. 1 and 2, the mobile communication terminal of the present invention includes a main body 100 having a liquid crystal display (LCD) window 120, and a sub-body 200 slidably connected to one side of the main body 100.

The main body 100 and the sub-body 200 can be connected with each other by a slidable connecting means, not shown, which includes a sliding rail and a channel into which the sliding rail is fitted.

The main body 100 and the sub-body 200 include respective circuit boards (not shown) which are electrically connected to each other. These circuit boards are electrically connected with the LCD window 120, which visually displays signals received from the circuit boards.

In addition, the sub-body 200 has a battery (not shown) mounted therein in order to supply power to the circuit boards.

The main body 100 includes a first antenna 110 in an upper end thereof which can transmit and receive radio waves having a predetermined frequency bandwidth.

The sub-body 200 includes a second antenna 210 in a lower end thereof which can transmit and receive radio waves having the same frequency bandwidth as the first antenna 110.

In this manner, the first and second antennas 110 and 210 can transmit and receive the radio waves having the same frequency bandwidth, for instance those for Global System for Mobile Communications (GSM) and GSM.

The sub-body 200 includes a support plate 300 of the present invention on one surface thereof. The support plate 300 supports the sub-body 200.

Thus, as illustrated in FIG. 1, when the main body 100 and the sub-body 200 relatively move to overlap each other, the upper end of the support plate 300 is opposite to the first antenna 110 of the main body 100.

Thus, the upper end of the support plate 300 is located adjacent to a radio coverage area of the first antenna 110.

The radio coverage area is a predetermined distance from the first antenna in all directions including leftward and rightward direction (in a transverse direction), and upward and downward directions (in a longitudinal direction).

Next, the configuration of the support plate of the present invention will be described in detail.

First Embodiment

Referring to FIG. 3, the support plate of the present invention includes a plate body 310, and a radio coverage area member 320 installed on one end of the plate body 310.

The plate body 310 has a predetermined width and length. The width and length of the plate body are less than or equal to those of the sub-body 200.

The plate body 310 has the shape of a flat plate and is made of metal.

The radio coverage area member 320 is installed at one of opposite ends of the plate body 310 so as to be located adjacent to a radio coverage area of the first antenna 110, and is preferably installed at an upper end of the plate body 310.

The radio coverage area member 320 is made of plastic.

The plastic is one of colored plastic and colorless plastic.

Here, as illustrated in FIG. 4, the plate body 310 is bonded with the radio coverage area member 320 by heat.

The radio coverage area member 320 is provided with a plurality of through holes 321 at one end thereof in a longitudinal direction.

One end of the plate body 310 comes into contact with one end of the radio coverage area member 320 in a longitudinal direction.

A plurality of thermal bonding members 322 is inserted into the respective through-holes 321.

The thermal bonding members 322 have heads supported around the respective through-holes 321.

In this state, each thermal bonding member 322 is bonded with the top of one end of the plate body 310 at a lower end thereof using heat.

Thus, one end of the plate body 310 can be bonded with the radio coverage area member 320.

Meanwhile, referring to FIG. 5, the radio coverage area member 320 can be separated from the plate body 310.

To this end, the plate body 310 includes a ridge 311, which protrudes from an end face of one end of the plate body in a longitudinal direction.

Further, the radio coverage area member 320 is provided with a slot 323, into which the ridge 311 is fitted, at one end thereof.

Referring to FIG. 6, the ridge 311 can be further provided with at least one circular or elliptical bulge 311a at an end thereof.

Thus, the slot 323 can be further provided with at least one recess 323a, into which a bulge 311a is fitted, in a blind end thereof.

Accordingly, when the ridge 311 of the plate body 310 is fitted into the slot 323 of the radio coverage area member 320, the bulge 311a is fitted into the recess 323a, so that the plate body 310 is joined with the radio coverage area member 320.

In contrast, the above-explained process can be reversed in order to separate the plate body 310 from the radio coverage area member 320.

According to the first embodiment of the present invention as described above, when the support plate 300 is installed on the sub-body 200, the radio coverage area member 320 is disposed adjacent to the radio coverage area of the first antenna 110.

Thus, when the first antenna 110 transmits or receives the radio waves to or from the outside, the radio waves go through the radio coverage area member 320 made of plastic.

In this connection, the performance of the first antenna 110 of the mobile communication terminal of the present invention will be described with reference to FIG. 7.

FIG. 7 is a table showing the results of comparing the case where one end of the conventional support plate made of metal is disposed adjacent to the radio coverage area of the first antenna 110 (case 1) with the case where the upper end of the radio coverage area member 320 of the present invention is disposed adjacent to the radio coverage area of the first antenna 110 (case 2) in terms of power and bit error rate (BER) of the first antenna 110.

Here, the power and BER of the first antenna 110 are measured under condition that the radio coverage area member 320 is located opposite the first antenna 110, namely adjacent to the radio coverage area of the first antenna 110.

As illustrated in FIG. 7, it can be found that the power and the BER of the case 2 are increased to some extent compared to those of the case 1.

Thus, it can be found that power efficiency and radio receive sensitivity of the first antenna 110 of the case 2 are more easily increased compared to those of the case 1.

Meanwhile, in the case where the radio coverage area member 320 is forcibly uncoupled from one end of the plate body 310, the results of the power and BER will refer to FIG. 12.

In this case, the first antenna 110 transmits or receives the radio waves to or from the outside through an empty space that is occupied by the radio coverage area member 320.

Here, the term "DCS" (Digital Communication System) of FIG. 7 refers to the 1800 MHz bandwidth for the GSM system.

Second Embodiment

Figure 9:
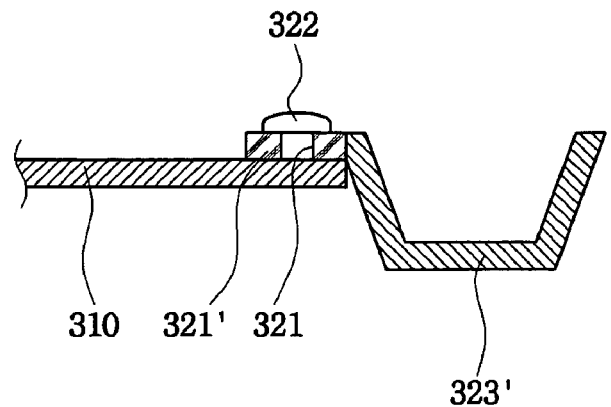
FIG. 9 is a cross-sectional view taken along the line III-III' of FIG. 8.
Figure 10:
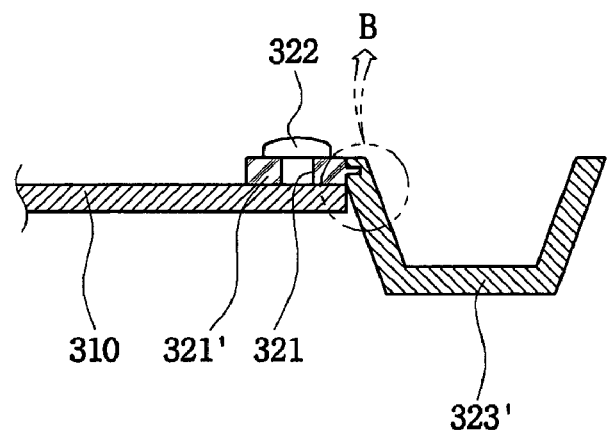
FIG. 10 is a cross-sectional view illustrating a different structure in which the plate body of FIG. 8 is joined with the radio coverage area member.
Figure 11:
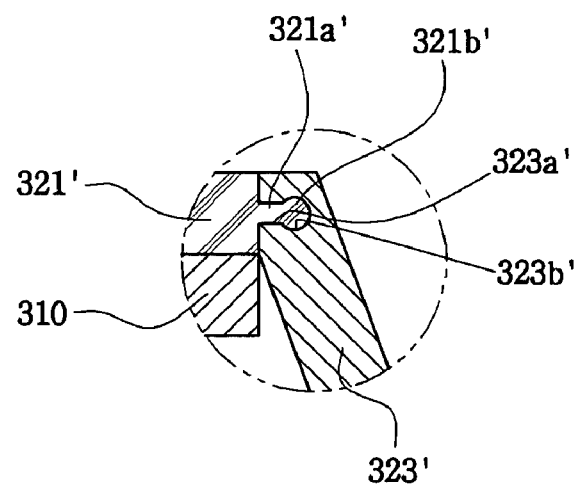
FIG. 11 is an enlarged cross-sectional view illustrating part B of FIG. 10.

FIG. 8 is a perspective view illustrating a support plate according to a second embodiment of the present invention. FIG. 9 is a cross-sectional view taken along the line III-III' of FIG. 8. FIG. 10 is a cross-sectional view illustrating a different structure in which the plate body of FIG. 8 is joined with the radio coverage area member. FIG. 11 is an enlarged cross-sectional view illustrating part B of FIG. 10. FIG. 12 shows a data table in which the case of employing a support plate according to a second embodiment of the present invention is compared with the case of employing a conventional support plate in terms of the performance of a first antenna.

Referring to FIG. 8, the support plate 300' according to a second embodiment of the present invention includes a plate body 310 made of metal as in the first embodiment, and a radio coverage area member 320' installed on one end of the plate body 310.

The radio coverage area member 320' includes a main support body 321', which is located at one end of the plate body 310 and has a predetermined length, a pair of extending bodies 322', which extends from opposite ends of the main support body 321' at a predetermined length, and a cover body 323', one end of which is located between the main support body 321' and the extending bodies 322'.

Thus, the main support body 321' is located at one end of the plate body 310, and the extending bodies 322' extend from the opposite ends of the main support body 321' at a predetermined length. Further, the cover body 323' is interposed between the main support body 321' and the extending bodies 322'.

Thus, the extending bodies 322' can support opposite sides of the upper end of the sub-body 200.

In addition, the extending bodies 322' are made of metal.

Referring to FIG. 9, the main support body 321' is bonded with one end of the plate body 310 by heat.

This thermal bonding is substantially the same as in the first embodiment described with reference to FIG. 4, and thus a detailed description thereof will be omitted.

Referring to FIG. 9 again, the radio coverage area member 320' can be separated from the plate body 310.

In this case, as illustrated in FIG. 9, one end of the plate body 310 is provided with a plurality of protruding stubs 322 in a longitudinal direction.

Further, the cover body 323' is provided with a slot 321a' in one end thereof as illustrated in FIGS. 10 and 11, and the main support body 321' and the extending bodies 322' are provided with respective ridges 321a' along inner circumferences thereof as illustrated in FIG. 10.

In detail, one end of the radio coverage area member 320' (i.e., the main support body 321') includes the ridge 321a', and the cover body 323' includes the slot 323a' into which the ridge 321a' is fitted.

Referring to FIG. 11, the ridge 321a' can be further provided with at least one circular or elliptical bulge 321b' at an end thereof.

Thus, the slot 323a' can be further provided with at least one recess 323b', into which the bulge 321b' is fitted, in a blind end thereof.

Accordingly, when the ridge 321a' of the main support body 321' is fitted into the slot 323a' of the cover body 323', the bulge 321b' is fitted into the recess 323b', so that the plate body 310 is joined with the main support body 321' of the radio coverage area member 320'.

In contrast, in order to separate the plate body 310 from the radio coverage area member 320', the reverse process is conducted.

Thus, the cover body 323 can be selectively separated from the main support body 321' and the extending bodies 322'.

According to the second embodiment of the present invention as described above, when the support plate 300' is installed on the sub-body 200, the radio coverage area member 320' is disposed adjacent to the radio coverage area of the first antenna 110.

If the cover body 323' is uncoupled from the main support body 321' and the extending bodies 322', the first antenna 110 transmits or receives the radio waves to or from the outside through an empty space that is occupied by the cover body 323'.

In this connection, the performance of the first antenna 110 of the mobile communication terminal of the present invention will be described with reference to FIG. 12.

FIG. 12 is a table showing the results of comparing the case where one end of the conventional support plate made of metal is disposed adjacent to the radio coverage area of the first antenna 110 (case 1) with the case where the empty space of the radio coverage area member 320' of the present invention is disposed adjacent to the radio coverage area of the first antenna 110 (case 2) in terms of power and bit error rate (BER) of the first antenna 110.

Here, the power and BER of the first antenna 110 are measured under condition that the radio coverage area member 320' is located opposite the first antenna 110, namely adjacent to the radio coverage area of the first antenna 110.

As illustrated in FIG. 12, it can be found that the power and the BER of the case 2 are increased to some extent compared to those of the case 1.

Thus, it can be found that power efficiency and radio receive sensitivity of the first antenna 110 of the case 2 are more easily increased compared to those of the case 1.

Meanwhile, in the case where the support cover 323' is interposed between the main support body 321' and the extending bodies 322', the results of the power and BER will refer to FIG. 7.

In this case, the first antenna 110 transmits or receives the radio waves to or from the outside through the cover body 323'.

Here, the term "EGSM" (Extended Global System for Mobile communications) of FIG. 12 refers to the 900 MHz bandwidth for the GSM system.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A support plate, comprising:
   a plate body made of a metal plate with predetermined width and length; and
   a radio coverage area member made of plastic, the radio coverage area member provided on one of opposite ends of the plate body so as to be located adjacent to a radio coverage area of an antenna.

2. The support plate according to claim 1, wherein the plate body is bonded with the radio coverage area member by heat.

3. The support plate according to claim 2, wherein:
   the radio coverage area member has a plurality of through-holes at one end thereof in a longitudinal direction;
   the plate body comes into close contact with one end of the radio coverage area member at one end thereof;
   the plate body is bonded with the radio coverage area member by thermal bonding members, which are inserted into the respective through-holes and heads of which are supported around the respective through-holes; and
   the thermal bonding members are bonded with one end of the plate body by heat.

4. The support plate according to claim 1, wherein the radio coverage area member is uncoupled from the plate body.

5. The support plate according to claim 3, wherein:
   the plate body includes a ridge protruding from one end thereof in a longitudinal direction; and
   the radio coverage area member includes a slot, into which the ridge is fitted, in one end thereof.

6. The support plate according to claim 1, wherein the radio coverage area member includes: a main support body, which is located at one end of the plate body and has a predetermined length; a pair of extending bodies, which extends from opposite ends of the main support body at a predetermined length; and a cover body, which is located between the main support body and the extending bodies.

7. A mobile communication terminal, comprising:
   a main body, which has a first antenna at a first end thereof;
   a sub-body, which is slidably connected to one surface of the main body, has a second antenna at a second end thereof which is opposite to the first end of the main body; and
   a support plate, which is installed in the sub-body so as to support the sub-body, is disposed adjacent to a radio coverage area of the first antenna at one of opposite ends thereof.

8. The mobile communication terminal according to claim 7, wherein the support plate includes a plate body, which is disposed adjacent to a radio coverage area of the second antenna at a lower end thereof, having a shape of a flat plate with predetermined width and length and made of metal, and a radio coverage area member, which is connected with one end of the plate body such that an upper end thereof is located adjacent to the radio coverage area of the first antenna and made of plastic.

9. The mobile communication terminal according to claim 8, wherein the plate body is bonded with the radio coverage area member by heat.

10. The mobile communication terminal according to claim 9, wherein:
the radio coverage area member has a plurality of through-holes at one end thereof in a longitudinal direction;
the plate body comes into close contact with one end of the radio coverage area member at one end thereof;
the plate body is bonded with the radio coverage area member by a plurality of thermal bonding members, which is inserted into the respective through-holes and heads of which are supported around the respective through-holes; and
the thermal bonding members are bonded with one end of the plate body by heat.

11. The mobile communication terminal according to claim 8, wherein the radio coverage area member is uncoupled from the plate body.

12. The mobile communication terminal according to claim 10, wherein:
the plate body includes a ridge protruding from one end thereof in a longitudinal direction; and
the radio coverage area member includes a slot, into which the ridge is fitted, in one end thereof.

13. The mobile communication terminal according to claim 8, wherein the radio coverage area member includes: a main support body, which is located at one end of the plate body and has a predetermined length; a pair of extending bodies, which extends from opposite ends of the main support body at a predetermined length; and a cover body, which is located between the main support body and the extending bodies.

* * * * *